United States Patent [19]

Harbeck et al.

[11] 4,082,300
[45] Apr. 4, 1978

[54] PACKING FOR STUFFING BOXES OF PISTON PUMPS WITH METAL PLUNGER

[75] Inventors: Alfred Harbeck, Kriftel, Taunus; Dieter Rebhan, Hofheim, Taunus; Richard Walburg, Schwalbach, Taunus, all of Germany

[73] Assignee: Hoechst Aktiengesellschaft, Frankfurt am Main, Germany

[21] Appl. No.: 734,608

[22] Filed: Oct. 21, 1976

[30] Foreign Application Priority Data

Oct. 23, 1975 Germany .............................. 2547415

[51] Int. Cl.² .............................................. F16J 15/06
[52] U.S. Cl. .................................................. 277/123
[58] Field of Search ........................ 277/123, 124, 125

[56] References Cited

U.S. PATENT DOCUMENTS

| 967,235 | 8/1910 | Ramberg | 277/123 |
| 2,856,209 | 10/1958 | Watson | 277/123 |
| 3,586,341 | 6/1971 | Whittaker | 277/124 |
| 3,655,207 | 4/1972 | Schettler | 277/125 |

*Primary Examiner*—Robert I. Smith
*Attorney, Agent, or Firm*—Curtis, Morris & Safford

[57] ABSTRACT

When corrosive and/or noxious liquids are to be conveyed by a piston pump having a plunger of hard metal, the stuffing box contains a special packing composed of distance rings, detention rings with circumferential recesses in their surfaces, supporting rings with plane and double-conical bearing surfaces, V-shaped packing rings with a circumferential recess in their inner surface, double-conical rings and lubricating ring.

4 Claims, 5 Drawing Figures

PACKING FOR STUFFING BOXES OF PISTON PUMPS WITH METAL PLUNGER

This invention relates to a packing for stuffing boxes of piston pumps with metal plunger, more particularly of piston pumps in which the plunger or at least the plunger surface consist of hard metal.

To convey corrosive and/or toxic liquids, for example ammonia, borofluoric acid, chlorine, hydrogen chloride, hydrofluoric acid, potassium hydroxide solution, nitric acid, hydrochloric acid, sulfur dioxide, sulfuric acid, sulfurous acid, hydrogen sulfide, and hydrogen peroxide, diaphragm pumps are used. They ensure a conveyance without any loss and without pollution of the environment by such substances, but they have the following disadvantages: Owing to the permanent alternating binding stress the service life of the diaphragm is limited (material fatigue). Under the most favorable conditions it is about 1 year. Because of the small possible deflection, diaphragms of a relatively large diameter have to be used to obtain a satisfactory conveying rate in the range of at most 2 to 4 cubic meters per hour.

Centrifugal pumps are well suitable to convey liquids at a rate exceeding 1 cubic meter per hour under a pressure of up to 50 bars. They are unsuitable, however, for exact dosage and for conveying and/or dosing against pressures higher then 50 bars.

In principle, piston pumps are best qualified for the conveyance and/or dosage of corrosive and/or noxious liquids. The leakiness of the packings of their stuffing boxes is, however, rather disadvantageous. In many cases, the corrosive liquids to be conveyed have a minor interfacial tension and a low viscosity so that, on the one hand, the piston is thoroughly wetted, which causes losses of liquid through the packing and, on the other, the lubricating effect is strongly reduced. Frictional heat develops and after a short while the plunger and the packing are destroyed. Attempts have been made to tighten pumps of this type by elastic and/or semi-elastic packing elements which are subjected to high axial pressing force. This high axial pressing force results, however, in a high radical pressure acting against the piston, whereby frictional heat is also generated and the liquid film, which is insufficient in itself, is destroyed, for example by evaporation. As a result, the friction runs dry and after a short while the piston and the packing are ruined.

In order to prevent substances polluting the environment from leaking through the packings it is known to use a so-called hydraulic system comprising a U-shaped pipe containing, between the liquid to be conveyed and the plunger of the pump, an auxiliary liquid having little pollution effects which leaks through the packings of the pump instead of the liquid to be pumped. But with each stroke of the plunger a small amount of the liquid to be conveyed mixes with the auxiliary liquid, which is thus contaminated. A further serious drawback is the fact that a sufficiently iner auxiliary liquid cannot be found for most liquids to be conveyed.

It is, therefore, the object of the present invention to provide a packing for stuffing boxes of piston pumps which does not have the disadvantages of the known packings.

The packing according to the invention comprises a stationary mounting ring, detention rings with recess in their circumferential surfaces, supporting rings with plane and double-conical bearing surface, V-shaped packing rings with a recess or shoulder in their inner circumferential surface, double conical rings, lubricating ring and distance ring.

It has been found that particularly favorable results can be obtained when the individual elements of the packing are arranged in the following order: one stationary mounting ring, at least two detention rings, one supporting ring, at least three packing rings, at least one detention ring, one double-conical ring, one detention ring, one supporting ring, at least one packing ring, one lubricating ring, at least two detention rings, one supporting ring, at least two packing rings, at least two detention rings, one supporting ring, at least two packing rings, at least two detention rings, one supporting ring, at least two packing rings, one double-conical ring, one detention ring and one distance ring.

The largest bearing surface of the detention rings may be provided with a groove.

Stationary mounting ring, supporting ring, lubricating ring and distance ring are preferably made of metal, if necessary of chrome steel. The detention rings and the V-shaped packing rings are preferably made of hard burned coal. The double-conical rings are preferably made of a flexible graphite material.

The packing in accordance with the invention and the shape of the individual types of rings will now be described, by way of example only, with reference to the accompanying drawing in which FIG. 1 shows a detail of a piston pump with the packing of the invention;

Figure 1:
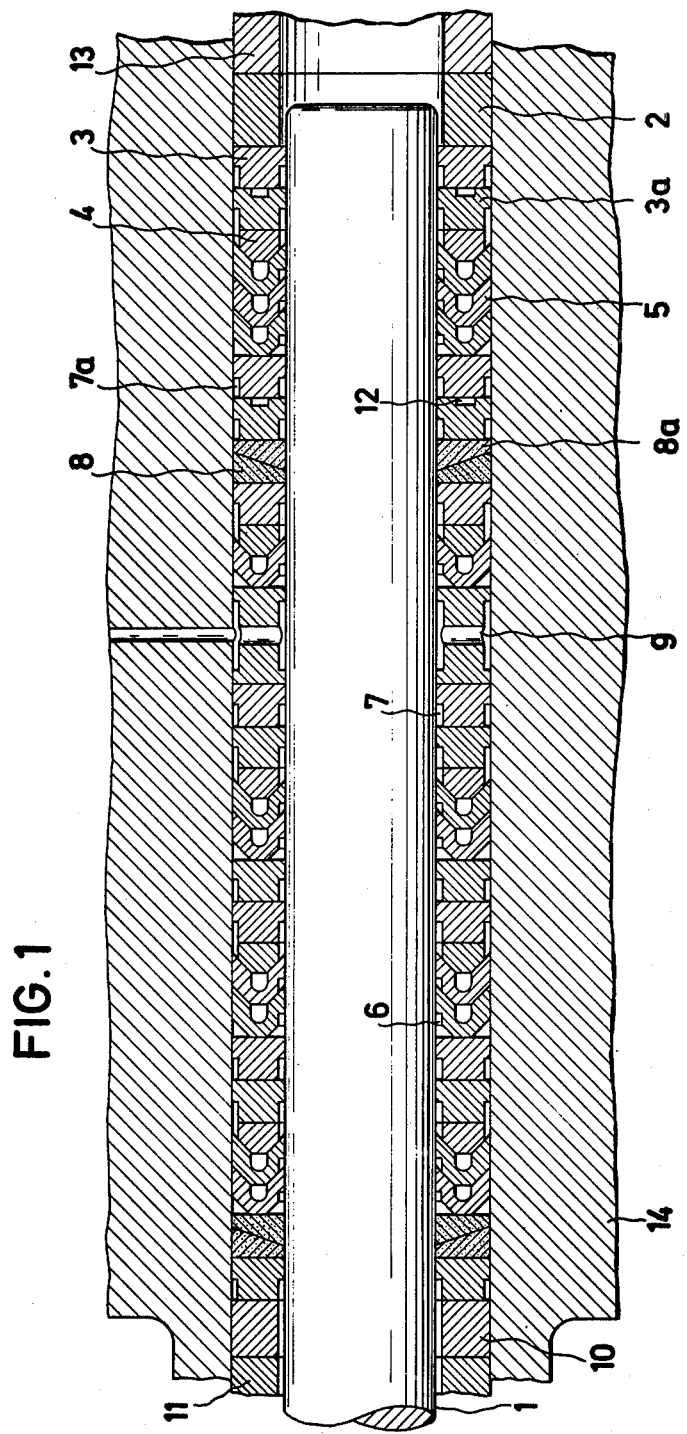
Figure 2:
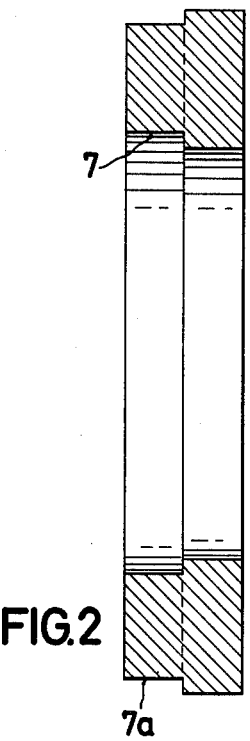
FIG. 2 is a cross sectional view of a detention ring.

Referring now to the drawing, the numerals have the following meanings: 1 plunger of the pump, 2 stationary mounting ring, 3 and 3a detention ring, 4 supporting ring, 5 V-shaped packing ring, 7 and 7a recesses in the circumferential surface of the detention rings 3 and 3a, 8 and 8a double-conical ring, 9 lubricating ring, 10 distance ring, 11 gland of the stuffing box, 12 groove in the detention ring 3a, 13 pump cylinder, 14 pump case, 15 basic surface of detention ring 3a.

Figure 3:
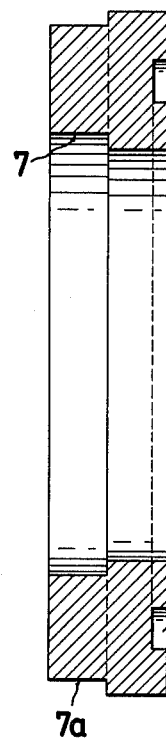
FIG. 3 is a cross sectional view of another form of construction of a detention ring.
Figure 4:
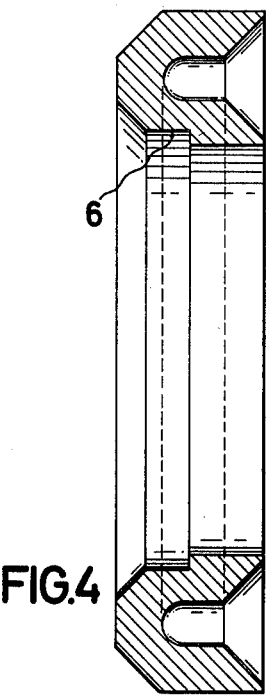
FIG. 4 is a cross sectional view of a V-shaped packing ring.
Figure 5:
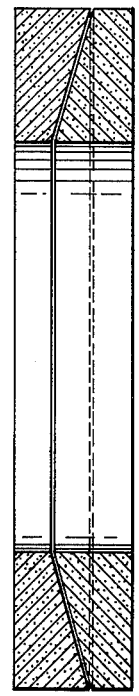
FIG. 5 is a cross sectional view of a double-conical ring.

The inner and outer surfaces of the detention rings 3, are provided with circumferential recesses 7 and 7a having a depth corresponding to up to 1/10 of the thickness of the ring. The neck formed by the recesses (depth of ingress) has a length which corresponds to 0.3 to 0.6 time the total height of the respective ring. According to a special embodiment (FIG. 3), the basic surface 15 of the detention ring is provided with a groove 12 whereby the spring action rendered possible by the recess 7 and 7a of the ring is improved. The inner surface of the V-shaped packing rings 5 is likewise provided with a circumferential recess 6, the depth of which also corresponds to up to 1/10 of the thickness of the ring. The depth of ingress corresponds to 0.1 to 0.3 time the total height of the respective ring.

What is claimed is:

1. A packing for stuffing boxes of piston pumps including a metal plunger and pump cylinder, receiving said plunger, in a pump case, said packing being mounted in said pump case for receiving said plunger and including a stationary mounting ring, detention rings adjacent said mounting ring, said detention rings having inner and outer circumferential surfaces each having recesses formed therein, supporting rings having plane and double-conical bearing surfaces, with the plane surface of one of said supporting rings engaging one of said mounting rings, V-shaped packing rings having inner and outer circumferential surfaces and a circumferential recess formed on their inner surfaces, with one of said packing rings receiving the double-conical bearing surface of one of said supporting rings, double-conical rings, a lubricating ring, and a distance ring assembled in said pump case to form a seal against said plunger.

2. A packing for stuffing boxes of piston pumps including a metal plunger and pump cylinder, receiving said plunger, in a pump case, said packing being mounted in said pump case for receiving said plunger and comprising, a stationary ring, detention rings having inner and outer circumferential surfaces and a recess formed therein, supporting rings having plane and double-conical bearing surfaces, V-shaped packing rings having inner and outer circumferential surfaces and a circumferential recess in their inner surface, double-conical rings, a lubricating ring and distance ring, said rings being arranged in a predetermined order in said pump case as follows: one stationary mounting ring, at least two detention rings, one supporting ring, at least three packing rings, at least one detention ring, one double-conical ring, one detention ring, one supporting ring, at least one packing ring, one lubricating ring, at least two detention rings, one supporting ring, at least two packing rings, at least two detention rings, one supporting ring, at least two packing rings, at least two detention rings, one supporting ring, at least two packing rings, one double-conical ring, one detention ring and one distance ring.

3. A packing as claimed in claim 1, wherein the largest bearing surface of the detention rings is provided with a groove.

4. A packing as claimed in claim 1, wherein the double-conical rings are made from flexible graphite material.

* * * * *